Oct. 1, 1940.　　　J. R. MILLER　　　2,216,622
CHECK VALVE
Filed Jan. 12, 1938
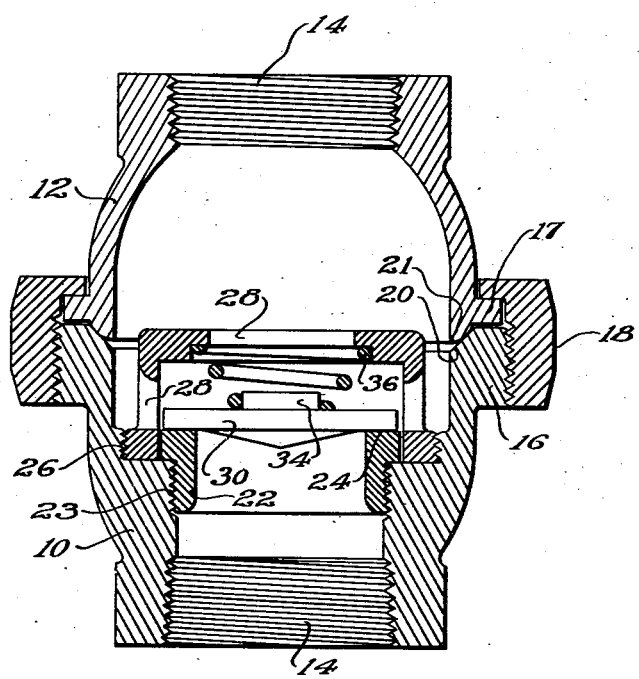
Witness
Paul F. Bryant
Inventor
John R. Miller Patented Oct. 1, 1940

2,216,622

UNITED STATES PATENT OFFICE 2,216,622

CHECK VALVE

John R. Miller, Dormount, Pa.

Application January 12, 1938, Serial No. 184,531

1 Claim. (Cl. 251—144)

The present invention relates to check valves, and more particularly to check valves forming part of a pipe union.

The purpose and object of the invention is to provide a check valve of this type which may be inserted in existing pipe lines, and in addition a valve which may be conveniently inserted and removed from a pipe line as an entity.

With these and other objects in view, the various features of the invention consist in certain novel features of construction, combinations and arrangements of parts hereinafter described and claimed, the advantages of which will be obvious to those skilled in the art from the following description.

The accompanying drawing illustrates the preferred form of my improved union and check valve illustrated in a vertical longitudinal section.

The valve shown in the illustrated embodiment of the invention comprises essentially a union having complementary sleeve portions indicated at 10 and 12 respectively. Each sleeve portion, as is usual in this type of joint, is provided with an internally threaded connection 14 and with connecting flanges indicated at 16 and 17, respectively, which are held in assembled relation by a coupling sleeve 18. The complementary sleeves are provided with opposed sealing faces 20 and 21, which may preferably be ground surfaces to insure a tight joint.

Mounted in the sleeve 10 is a check valve assembly which comprises a disk valve loosely received in an open or skeleton valve cage and guided by the cage in its movements toward and away from the seat. This structure, as indicated, comprises a separate seat ring 22 threaded within the sleeve at 23 and having a flat seat 24. A valve cage of circular formation is threadedly connected to the sleeve at 26 about the seat ring 22. The valve cage is provided with side openings 28 for discharge of fluid when the valve is open and it will be noted that the central passage through the sleeve is appreciably enlarged above the threads 26 to provide a substantial annular space for free discharge of fluid from the side openings 28. A disk valve 30 is freely received within the cage and loosely guided thereby, the disk valve resting upon the seat 24, and normally held thereon by a coiled loading spring 36 which is interposed between the valve and the upper portion of the valve cage. As indicated, the disk valve is provided with a stud 34 which acts to position and center the lower end of the spring, and the upper end of the spring is seated in a circumferential recess formed in the valve cage about the upper centrally disposed opening 28.

This structure forms a simple and practical device for a line check easily adapted to existing pipe lines, and providing a type of valve which will operate for long periods without failure, due to the complete absence of a guiding stem or equivalent structure which may cause cramping or jamming of the valve. The valve and seat may be preferably made of either brass, bronze or stainless steel as service condition may require.

What is claimed is:

A union element and check valve comprising a circular sleeve member having a central passage the diameter of which increases by steps from one end of said sleeve member to the opposite end thereof, a ring seat secured to said sleeve within said passage at the termination of the zone of least passage diameter, a valve cage secured to said sleeve within said passage at a zone of greater passage diameter, said valve cage projecting into the zone of greatest passage diameter whereby a substantial annular space exists between the sides of said valve cage and the walls of said sleeve member in the zone of greatest passage diameter, circumferential openings in said valve cage communicating with said annular space, a disc valve reciprocable within and guided wholly by said valve cage in a manner to cooperate with said ring seat, and a compression loading spring interposed between said disc valve and the end of said valve cage.

JOHN R. MILLER.